Jan. 2, 1951     C. H. CRAWLEY     2,536,727
METHOD OF MAKING VALVES
Filed Oct. 11, 1946     2 Sheets-Sheet 1
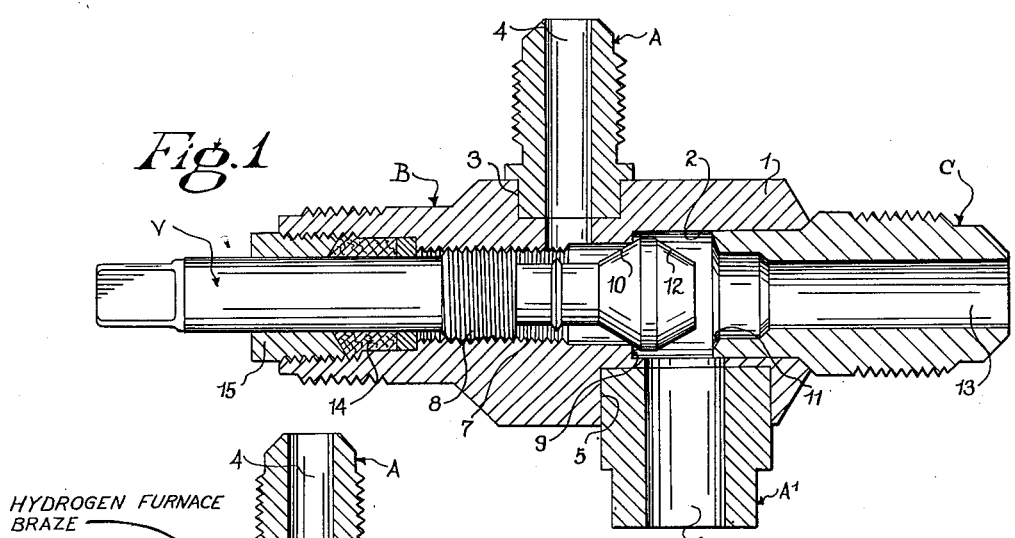
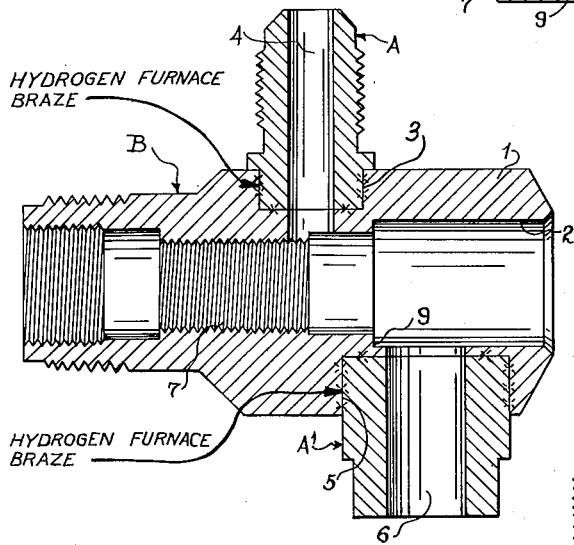
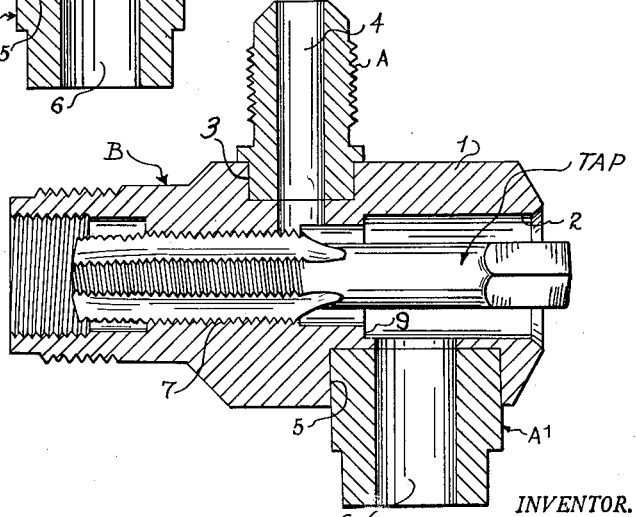
INVENTOR.
CHARLES H. CRAWLEY
BY Richey & Watts
ATTORNEYS Patented Jan. 2, 1951

2,536,727

UNITED STATES PATENT OFFICE 2,536,727

METHOD OF MAKING VALVES

Charles H. Crawley, Cleveland, Ohio, assignor to The Weatherhead Company, Cleveland, Ohio, a corporation of Ohio Application October 11, 1946, Serial No. 702,749

1 Claim. (Cl. 29—157.1)

This invention relates to valves, more particularly to a double-seat refrigerator valve assembly and a method of making the same.

One of the objects of my invention is to provide a multi-part valve body which includes a pair of valve seats, the parts being secured to each other by bonding processes involving the application of heat. These processes are carried out so as to soften the valve seat portions of the assembly relative to the valve stem part that engages them.

It is a further object of my invention to provide a valve and method of making the same in accordance with the preceding object which permits the valve seat and the stem part that engages them to be made of the same material, preferably relatively inexpensive, easily machined ferrous screw stock.

Another object of an embodiment of my invention lies in the provision of a multiseat valve in which the body and one seat are of ferrous metal and the stem and another seat of brass, the stem being harder than either seat.

Another object is to provide a valve and method of making the same wherein a fluid-tight bond between the parts is obtained without danger of the bonding material flowing into the threads that support the valve stem when the valve assembly is finally completed.

Other objects and advantages relating to simplicity of construction and economy of manufacture will appear in the following specification and the appended drawings.

In the drawings:

Fig. 1 is a sectional view of my complete assembled valve structure;

Fig. 2 shows the first brazing operation;

Fig. 3 shows the tapping operation to chase the threads after the brazing operation.

Figure 4:
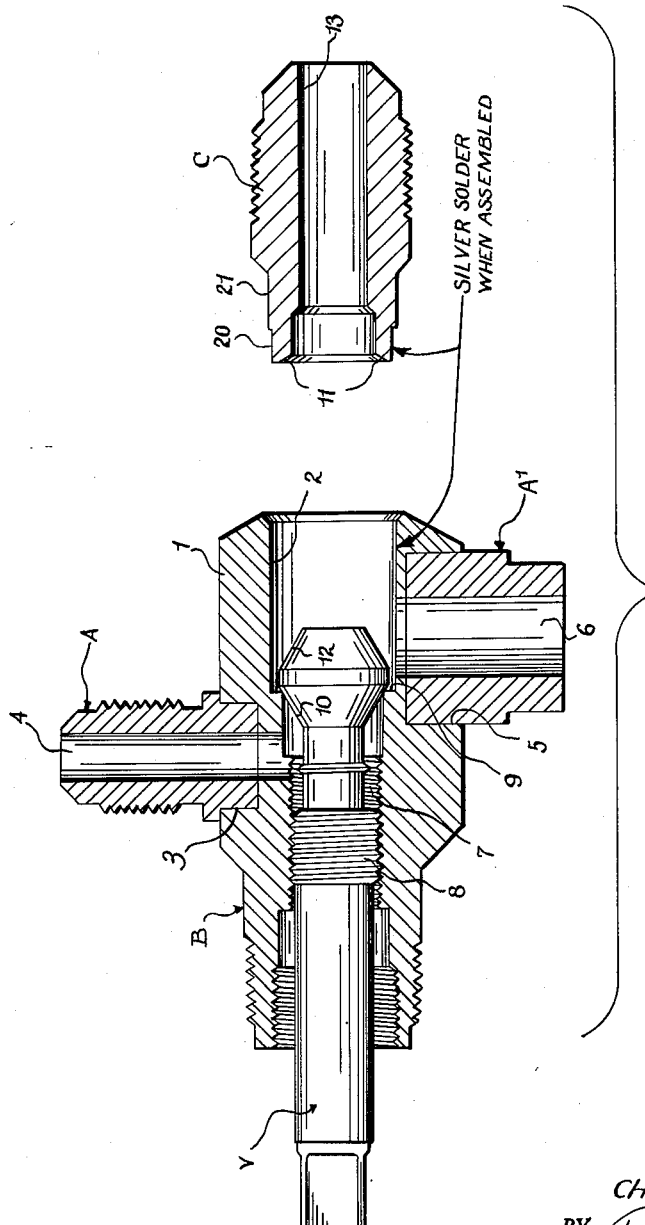
Fig. 4 shows the valve stem assembled in the body after the threads are chased just prior to the final silver soldering operation.

The valve of the present invention is particularly adapted for use in refrigerating systems wherein a pair of sequentially engaged valve seats is provided for engagement by an enlarged valve stem portion. In order to form a rugged and economical valve, it is desirable to make the parts from ordinary ferrous sulphur screw stock and to so design them that the parts may be formed on a screw machine and assembled together to form a finished valve. The novel method herein described is a modification of the method described in the patent issued to Albert J. Weatherhead, Jr., #2,209,709, July 30, 1940. In the method therein described the valve body parts may be made of sulphur screw stock and after the valve stem is threaded in the valve body all parts are brazed together. In that patent the valve stem is preferably made of stainless steel in order that it will be left in a relatively hard condition after the annealing following the brazing operation, and in order that the brazing material will not tend to cling to the threads of the valve stem. I have found that by using a modified method of manufacture I can obtain all the advantages inherent in the Weatherhead structure and, at the same time, make the valve stem itself of the same material as that of the body parts, thereby producing a structure more economical to manufacture. As will be understood as the present description of a preferred embodiment proceeds, I have succeeded in making all parts of the same material and simultaneously producing a valve wherein the two seat parts are relatively soft as compared to the valve stem part that engages them.

My valve includes a valve body B preferably composed of a ferrous screw stock which can be turned in a screw machine with a minimum of operations. The body B is longitudinally bored and has an end portion 1 which includes an enlarged bore 2 to receive the head of the valve stem. A counterbore 3 is formed in the valve body to receive nipple A, which nipple is bored as at 4 to communicate with the bore in the valve body. A second counterbore 5 is provided in the body to receive a second nipple $A_1$ having through aperture 6 communicating with the bore 2 of the valve body.

Third nipple C is mounted in the bore 2 as will be described presently. The body B is threaded as at 7 for engagement by threads 8 formed on valve stem V. The body B has a seat portion 9 for engagement by an enlarged conical seat portion 10 on the valve stem. Similarly, nipple C has a seat portion 11 for engagement by conical portion 12 of the valve stem. Nipple C is apertured for fluid flow as at 13. It can be seen that with this construction a fluid passage can be selectively effected between the nipples A and $A_1$ or between nipples $A_1$ and C, the latter being the condition shown in Fig. 1. As mentioned previously, nipple C may likewise be formed of ferrous screw stock.

In manufacturing the assemblage shown in Fig. 1, I first place nipples A and $A_1$ into their respective counterbores, and as indicated in Fig. 2, I copper braze the parts together in a reducing or hydrogen-atmosphere furnace. The valve body B and the nipples may be of free-cutting screw stock such as SAE #1112, which stock is obtainable in round ferrous rod stock suitable for screw machines. This material in stock form has a hardness of about 94-B on the Rockwell scale. This material has the hardness characteristic that when it is heated in the brazing furnace to temperatures in the neighborhood of 2000° F., and cooled at a relatively slow rate of about 55° per minute, the hardness of the material is considerably decreased, becoming about 68-B on the Rockwell scale.

I have found that it is not uncommon for a brazing material to flow into the interior of the valve body and cling to the threads 7 during the brazing operation. However, the first operation leaves the bore 2 open for later insertion of the valve stem, which permits me to run a tap through threads 7 thereby removing any particle of brazing material from their surface.

Since the valve stem V was not inserted during the brazing operation, its hardness remains at its original value of about 94-B on the Rockwell scale, which is about 26 points harder than the valve seats with which the stem associates. Thus, scoring of the stem by the valve seat is eliminated and the stem is hard enough to smooth out surface irregularities in the relatively soft valve seat material, to form a pressure-tight seal.

After assembly of the stem in the body, the nipple C is inserted in the bore 2 as seen in Fig. 4. Nipple C has a portion 20 for insertion in the bore and may have an enlarged portion 21 to provide a press fit with the body. Portion 21 of nipple C, as well as the corresponding portions of nipples A and A₁, may be knurled or roughened to facilitate flow of the bonding metals between the parts. After portion C is inserted or pressed into the valve body, I bond the parts together by a silver soldering operation. I contemplate using a silver solder with a melting point of 1100° to 1500° F. depending upon the design of the valve. The temperature must be high enough to cause annealing of the valve seat but not so high that heat conducted to the stem will anneal it. The soldering operation is done with a local application of heat which heats up nipple C and its seat portion 11 to a temperature high enough to cause an annealing of the parts upon cooling. However, the heat applied at nipple C is not great enough to soften the brazing material used to attach nipples A and A₁ to the valve body, because the brazed parts are relatively remote from the point of heat application. Thus, when my valve assembly is completed both seats have been annealed and are appreciably softer than the valve stem part that engages them. Nevertheless, the relatively hard valve stem engaging part may be made of the same economical material as that of the remainder of the assemblage. However, since the valve stem is inserted after the brazing operation, and since a tap may be used to chase the threads before the stem is inserted, there is no danger that the brazing material will remain in the threads and cause interference between the parts.

I contemplate that I can carry out the sequence of operations described with one modification, namely, that the nipples A and A₁ are brazed to the body before all machining operations on body B are performed. The body B remains in an annealed condition and there is no possibility of brazing material remaining in the threads so that this method produces the same results attained by the preferred sequence of operations. In any event, the final bonding operation must be carried out so as to anneal the associated valve seat without softening the valve stem, and this is an important feature of my invention.

In a modified embodiment of my invention I may make the valve stem and nipple C of brass such as SAE 72 free turning brass. This stock has a Brinell hardness of about 80 which is appreciably harder than the annealed ferrous valve seat 9. In silver soldering the brass nipple in place, I prefer to use one of the lower melting point silver solders to avoid danger of softening or melting the brass nipple. After soldering I air cool the piece which anneals and softens the brass seat 11, the stem remaining in its original relatively hard condition. The valve body and nipples A and A₁ may be of ferrous stock as before.

Although I have described preferred forms of my invention and a modification thereof in detail, it will be understood by those skilled in the art that the claims, and not the described embodiments, are determinative of the scope of the invention.

Having thus described the present invention so that others skilled in the art may be able to understand and practice the same, I state that what I desire to secure by Letters Patent is defined in what is claimed.

What is claimed is:

The method of making a permanently assembled, dual-seated valve the basic metallic components of which are formed of substantially the same readily-machineable ferrous stock which stock may be softened by annealing comprising the steps of assembling a first body part with a second body part, said first part being formed of the aforesaid stock and having a first valve seat formed therein, brazing said body parts together and annealing them so as to leave said first valve seat in a relatively soft condition, inserting into said multi-part valve body a valve stem member formed of the aforesaid stock and being in an unannealed or relatively hard condition as compared to said first valve seat, assembling a third valve body part with said multi-part body, said third part being formed of the aforesaid stock and having a second valve seat formed thereon, and applying heat locally to simultaneously bond said third body part to said multi-part body and to anneal and soften said second valve seat, while leaving said valve stem member in a relatively hard, unannealed condition.

CHARLES H. CRAWLEY.

REFERENCES CITED

The following references are of record in the file of this patent:

UNITED STATES PATENTS

| Number | Name | Date |
|---|---|---|
| 99,653 | Davis | Feb. 8, 1870 |
| 1,175,034 | Woodward | Mar. 14, 1916 |
| 1,600,927 | Bryant | Sept. 21, 1926 |
| 1,615,591 | Mallory | Jan. 25, 1927 |
| 1,674,076 | Weatherhead | June 19, 1928 |
| 1,733,421 | Mauran | Oct. 29, 1929 |
| 1,804,624 | King | May 12, 1931 |
| 1,931,311 | Young | Oct. 17, 1933 |
| 2,208,394 | Scherer | July 16, 1940 |
| 2,209,709 | Weatherhead | July 30, 1940 |
| 2,323,160 | Stecher | June 29, 1943 |
| 2,396,956 | Larson | Mar. 19, 1946 |
| 2,402,029 | Dinnick | June 11, 1946 |
| 2,402,889 | Herreshoff | June 25, 1946 |

OTHER REFERENCES

Product Engineering, April 1948, copy in 113–112 Lit.